Dec. 18, 1951  S. B. CRARY  2,579,303
SERIES CAPACITOR PROTECTIVE SCHEME FOR TIE LINES
Filed Oct. 6, 1950
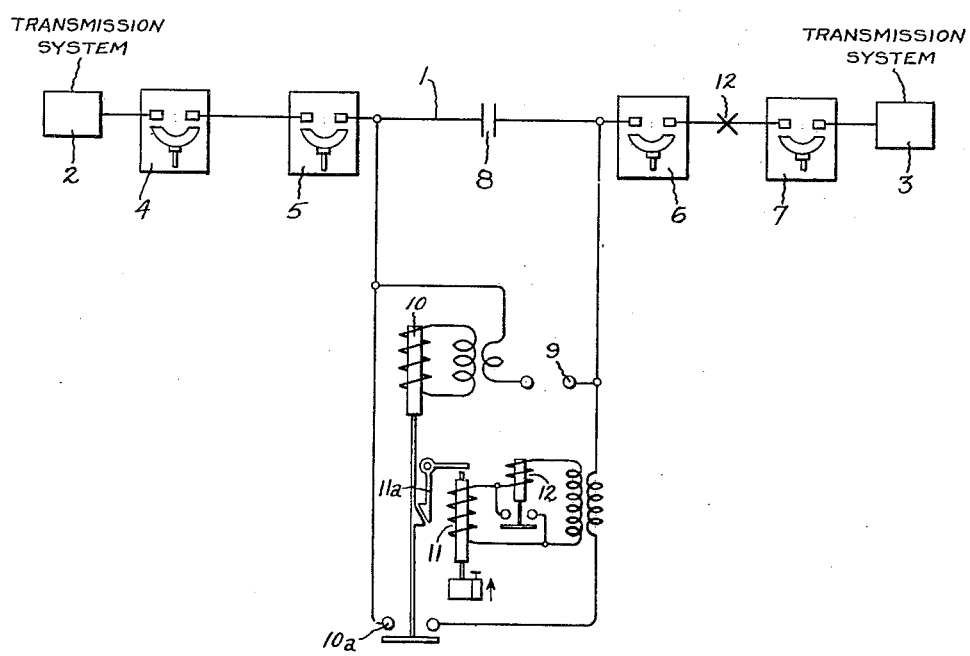
Inventor:
Selden B. Crary.
by Ernest H. Britton
His Attorney.

Patented Dec. 18, 1951

2,579,303

UNITED STATES PATENT OFFICE 2,579,303

SERIES CAPACITOR PROTECTIVE SCHEME FOR TIE LINES

Selden B. Crary, Schenectady, N. Y., assignor to General Electric Company, a corporation of New York Application October 6, 1950, Serial No. 188,727

2 Claims. (Cl. 175—294)

My invention relates to protective schemes for series capacitors in tie lines and more particularly to an improved system of relays for protecting series capacitors in tie lines.

It is well known in the art that series capacitors are used in tie lines joining two large power transmission systems operating in synchronism for voltage regulation and to aid in keeping the two systems in step. Such a capacitor is usually protected against overvoltages by means of a spark gap or other type of discharge device obtaining substantially instantaneous response, and by additional means for by-passing both the gap and the capacitor, and for interrupting the by-pass circuit to restore the capacitor to service when the current has fallen to a safe value.

When a fault occurs on one of the line sections of the tie line, the series capacitor is effectively removed from the line and the circuit breakers of that line section normally clear the fault and reclose. In many cases, the circuit breakers can reclose quickly enough to prevent the loss of synchronism between the systems. Therefore, it is desirable, in order to increase the stability, or power limit, that the series capacitor be returned to the circuit as soon as possible after the circuit breakers have reclosed.

The electrical angle between the voltages of the two generating systems is dependent upon the power being transferred from one system to the other. As the power transferred increases, the electrical angle increases thereby making it easier for the systems to pull out of synchronism in any given period of time. If the capacitor is reinserted in the tie line as soon as the reclosing operation starts, the transient voltage is of such magnitude, depending upon the power being transferred and the instantaneous voltage across the reclosing switch, that the spark gap may break down again and remove the capacitor from the circuit. This false reinsertion takes enough time to permit the transient due to the reclosing of the line breaker to die out. The additional time required for the false reinsertion also reduces the amount of power that may be transferred over the tie line without permitting the systems to pull out of synchronism.

Therefore, an important object of my invention is to provide an improved protective system for series capacitors in tie lines which provides instantaneous protection against overvoltages and delays the reinsertion of the capacitor in the tie line until the line circuit breakers have been reclosed.

Another object of my invention is to provide an improved protective system for series capacitors in tie lines whereby the over-all time for obtaining the successful reinsertion of the series capacitor in the tie line after the occurrence of the fault on the line is reduced.

In carrying out my invention in one embodiment thereof, I provide a spark gap for by-passing a series capacitor in a tie line in response to the occurrence of an overvoltage across the capacitor. A contactor operated in response to the breakdown of the spark gap is also provided having contacts in series in a circuit for by-passing both the spark gap and the capacitor. A latch mechanism holds the contacts closed. Means are provided for releasing the latch mechanism when the current through the by-passing contactor is above a predetermined value and below a second higher predetermined value for a predetermined time interval.

For additional objects and advantages and for a better understanding of my invention, attention is now directed to the following description and the accompanying drawing and also to the appended claims in which the features of my invention believed to be novel are particularly pointed out. The single figure of the drawing is a schematic diagram of a tie line connecting two synchronous power transmission systems and embodying my invention.

Referring to the drawing, the tie line 1 connects the synchronous power transmission systems 2 and 3, herein conventionally indicated as boxes. The circuit breakers 4, 5, 6 and 7 divide the tie line into sections for isolating faults. A condenser 8 is connected in series in tie line 1 and is protected from overvoltages by the spark gap 9 connected in parallel relation therewith. The contactor 10 connected to be energized in response to the breakdown of spark gap 9 operates the normally open contacts 10a. Contacts 10a represent a device such as a circuit breaker, for interrupting large currents. Contacts 10a are connected in parallel with condenser 8. Relays 11 and 12 are connected so as to be energized in response to the current flowing through contacts 10a when they are closed. In tie lines which normally carry high currents, contactor 10 and relays 11 and 12 are effectively connected as hereinbefore described through current transformers to make it unnecessary for them to handle the large currents appearing in the by-pass circuits.

Relay 11 is a conventional overcurrent relay having a time delay pickup for releasing the latch mechanism 11a when the current through the contacts 10a is above a predetermined value such, for example, as the normal load current in the tie line. Relay 12 is a conventional overcurrent relay having an instantaneous pickup and dropout when the current through the contacts 10a increases above and decreases below a predetermined value which is higher than the value which effects the operation of relay 11. When operated, the relay 12 completes a shunt circuit around the operating winding of relay 11.

The time delay for relay 11 has been assigned a minimum value of two cycles. This has been found to be the minimum time required in conventional high voltage systems for the transient voltages resulting from the reclosing of the line breakers to diminish to a value which is not appreciably about the transient voltage across the capacitor upon its reinsertion in tie line 1.

The magnitude of any increased time delay depends upon the natural frequency and decrement factor of the synchronous system and upon the maximum load carried by the tie line. The decrement factor is an index to the rate at which transients in the system will delay and is dependent upon the frequency. As hereinbefore explained, it becomes easier for the two transmission systems to pull out of step in a given number of cycles as the load carried by the tie line increases. Therefore, time delays of greater than two cycles might be used, but there would be an increased risk that the systems would pull out of synchronism before the series capacitor could be reinserted.

During normal operation, the line breakers are closed, contactor 10 and relays 11 and 12 are deenergized, and capacitor 8 is in series in tie line 1. Upon the occurrence of a fault on the tie line, such as at the point 12, breakers 6 and 7 open, isolating the faulted section of the line. If the fault should tend to produce an overvoltage on condenser 8, gap 9 breaks down as soon as its critical voltage level is reached. This action protects condenser 8 in the interval required for the line breakers to isolate the fault. As soon as gap 9 breaks down, the operating coil of contactor 10 energized, and condenser 8 is by-passed. Contactor 10 picks up closing contacts 10a thereby energizing relays 11 and 12. Contacts 10a are held closed by the latch mechanism 11a. The circuit through contacts 10a and the operating coils of relays 11 and 12 by-passes condenser 8 and spark gap 9, causing the spark across gap 9 to be extinguished. By the time contacts 10a have closed, or shortly thereafter, the line breakers are opened and the faulted section of tie line 1 is de-energized. Contactor 10 and relays 11 and 12 are also de-energized, but latch mechanism 11a holds contacts 10a closed, thereby holding condenser 8 short-circuited.

As soon as line breakers 6 and 7 reclose, relays 11 and 12 are energized and the time delay on relay 11 begins to run. If the fault has cleared so that only normal line current flows in the by-pass circuit after the breakers 6 and 7 are reclosed, this normal line current is arranged to effect the operation of only relay 11. After the expiration of two cycles, relay 11 picks up thereby disengaging latch mechanism 11a and releasing contacts 10a. The opening of contacts 10a reinserts capacitor 8 in series in the tie line.

If, however, the fault is still connected to the tie line when the line breakers 6 and 7 reclose, the fault current through the by-pass circuit is of sufficient value to cause the instantaneous overcurrent relay 12 to pick up and shunt the operating winding of relay 11 thereby preventing this relay 11 from unlatching the latch 11a as long as the fault remains connected to the tie line.

If there is no load on the tie line when the line circuit breakers reclose, contacts 10a remain latched closed until the load on tie line 1 increases to a point at which sufficient current is supplied to relay 11 to permit it to disengage latch mechanism 11a after the expiration of the time delay as hereinbefore described.

While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. In a synchronous transmission system having two separate portions and a tie line including a series capacitor interconnecting said portions, a protective system for said capacitor comprising a discharge device connected in a first shunt circuit about the capacitor for by-passing said capacitor in response to voltages impressed thereon above a predetermined level, an electromagnetic switching device having an operating coil connected to be energized in response to current in the first shunt circuit including said discharge device, a second shunt circuit connected in parallel with the first shunt circuit for bypassing said discharge device and said capacitor, said electromagnetic switching device having cooperating contacts in series in said second shunt circuit for closing said circuit upon energization of said operating coil, a latching device for holding said contacts in the closed position, and an electromagnetic release device having time delay means for retarding the pickup thereof and having an operating coil connected to be energized in response to current in the second shunt circuit upon closure of said contacts for releasing said latching device a time interval thereafter, the magnitude of said time interval being dependent upon the natural frequency and decrement factor of said synchronous transmission system.

2. In a synchronous transmission system having two separate portions and a tie line including a series capacitor interconnecting said portions, a protective system for said capacitor comprising a discharge device connected in a first shunt circuit about the capacitor for by-passing said capacitor in response to voltages impressed thereon above a predetermined level, an electromagnetic switching device having an operating coil connected to be energized in response to current in the first shunt circuit including said discharge device, a second shunt circuit connected in parallel with the first shunt circuit for bypassing said discharge device and said capacitor, said electromagnetic switching device having cooperating contacts in series in said second shunt circuit for closing said circuit upon energization of said operating coil, a latching device for holding said contacts in the closed position, an electromagnetic releasing device having time delay means for retarding the pickup thereof and having an operating coil connected to be energized in response to current in the second shunt circuit upon closure of said contacts for releasing said latching device a time interval thereafter, the magnitude of said time interval being dependent upon the natural frequency and decrement factor of said synchronous transmission system, and means including a second electromagnetic device having an operating winding connected to be responsive to a predetermined higher current in the second shunt circuit for rendering said electromagnetic releasing device ineffective.

SELDEN B. CRARY.

REFERENCES CITED

The following references are of record in the file of this patent:

UNITED STATES PATENTS

| Number | Name | Date |
|---|---|---|
| 2,158,926 | Butler | May 16, 1939 |
| 2,401,009 | Marbury | May 28, 1946 |
| 2,428,576 | Marbury | Oct. 7, 1947 |